US012503900B2

(12) United States Patent
Farooqui

(10) Patent No.: US 12,503,900 B2

(45) Date of Patent: Dec. 23, 2025

(54) WIRELESS MOVABLE BARRIER OPERATING SYSTEMS AND METHODS

(71) Applicant: GMI Holdings, Inc., Mt. Hope, OH (US)

(72) Inventor: Mohammad S. Farooqui, Fort Worth, TX (US)

(73) Assignee: GMI Holdings, Inc., Mount Hope, OH (US)

( * ) Notice: Subject to any disclaimer, the term of this patent is extended or adjusted under 35 U.S.C. 154(b) by 80 days.

(21) Appl. No.: 18/399,176

(22) Filed: Dec. 28, 2023

(65) Prior Publication Data

US 2025/0215736 A1 Jul. 3, 2025

(51) Int. Cl.
*E05F 15/43* (2015.01)
*E05F 15/77* (2015.01)

(52) U.S. Cl.
CPC .............. *E05F 15/43* (2015.01); *E05F 15/77* (2015.01); *E05F 2015/434* (2015.01)

(58) Field of Classification Search
CPC ..... E05F 12/43; E05F 12/77; E05F 2015/434; E05F 15/00; E05F 15/73; E05F 15/77; E05F 15/78; E05F 15/668
See application file for complete search history.

(56) References Cited

U.S. PATENT DOCUMENTS

| | | | | |
|---|---|---|---|---|
| 5,596,840 | A * | 1/1997 | Teich | E05F 15/668 49/26 |
| 7,301,480 | B2 * | 11/2007 | Fitzgibbon | E05F 15/70 340/5.23 |
| 8,621,245 | B2 | 12/2013 | Shearer | |
| 9,021,277 | B2 | 4/2015 | Shearer | |
| 9,143,009 | B2 | 9/2015 | Fitzgibbon | |
| 9,587,420 | B2 | 3/2017 | Keller, Jr. | |
| 9,734,645 | B2 * | 8/2017 | Farber | E05F 15/668 |
| 10,284,019 | B2 | 5/2019 | Shearer | |
| 11,075,538 | B2 * | 7/2021 | Järvelä | G06F 1/163 |
| 11,394,246 | B2 | 7/2022 | Shearer | |
| 2006/0281435 | A1 * | 12/2006 | Shearer | G06K 19/0702 455/343.1 |
| 2008/0186129 | A1 * | 8/2008 | Fitzgibbon | H02J 50/402 340/5.2 |
| 2012/0094604 | A1 * | 4/2012 | Amin | H04B 17/309 455/62 |

(Continued)

*Primary Examiner* — Brian T Misiura
(74) *Attorney, Agent, or Firm* — Haynes and Boone, LLP

(57) ABSTRACT

A barrier operating system includes a barrier operator configured to emit a charging signal and configured to open and close a movable barrier. The system also includes a wireless obstruction detection system comprising: a transmitter detector and a receiver detector. The transmitter detector includes a battery; a transmitter configured to transmit an IR beam; a communication module in wireless two-way communication with the barrier operator; and an energy harvester configured to receive the charging signal and direct power to the battery of the transmitter detector. The receiver detector includes a battery; a receiver configured to receive the IR beam from the transmitter; a communication module in wireless two-way communication with the barrier operator; and an energy harvester configured to receive the charging signal and direct power to the battery of the receiver detector.

16 Claims, 6 Drawing Sheets

(56) References Cited

U.S. PATENT DOCUMENTS

| | | | | |
|---|---|---|---|---|
| 2012/0112875 | A1* | 5/2012 | Heng | E05F 15/43 340/5.71 |
| 2018/0216389 | A1* | 8/2018 | Tsui | E05F 15/73 |
| 2019/0199139 | A1* | 6/2019 | Perry | H02J 50/30 |
| 2019/0306611 | A1* | 10/2019 | Mccollum Bechert | A44C 15/0015 |
| 2019/0353517 | A1* | 11/2019 | Abdelhafez | G01J 1/0411 |
| 2021/0135037 | A1* | 5/2021 | Martini | H10D 18/65 |

* cited by examiner

WIRELESS MOVABLE BARRIER OPERATING SYSTEMS AND METHODS

FIELD

The present disclosure relates to movable barrier systems, and more particularly to energy harvesting wireless movable barrier operating systems and methods.

BACKGROUND

Movable barriers, such as upward-acting sectional or single panel garage doors, residential and commercial rollup doors, and slidable and swingable gates, are used to alternatively allow and restrict entry to building structures and property. Some movable barrier systems include a barrier operator for controlling the movement of the movable barrier. Movable barrier systems also include devices which are separate from the barrier operator. Some of the separate devices can include a user input which prompts the barrier operator to open and close the barrier. Other separate devices, such as obstruction detectors, prevent the barrier from closing when an obstruction is detected in the movement path of the barrier. Traditionally, the components of movable barrier operating systems communicate with one another via direct connections using physical wires or cables.

Certain issues occur when physical wires and cables are used as the medium of communication and for connection. For example, physical wires are prone to deterioration, are physically unappealing, and can be damaged by outside forces such as animals that chew on the wires or objects that displace the wires, among other issues. Therefore, there is a need for wireless movable barrier operating systems and methods.

SUMMARY

The examples of the invention are summarized by the claims that follow the description.

Consistent with some examples, a barrier operating system may comprise a barrier operator configured to emit a charging signal and configured to open and close a movable barrier and a wireless obstruction detection system. The wireless obstruction detection system may comprise a transmitter detector comprising a battery, a transmitter configured to transmit an IR beam, a communication module in wireless two-way communication with the barrier operator, and an energy harvester configured to receive the charging signal and direct power to the battery of the transmitter detector. The wireless obstruction detection system may further comprise a receiver detector comprising a battery, a receiver configured to receive the IR beam from the transmitter, a communication module in wireless two-way communication with the barrier operator, and an energy harvester configured to receive the charging signal and direct power to the battery of the receiver detector.

In some examples, the wireless two-way communication between the transmitter detector and the barrier operator may be active when the IR beam is turned off. The wireless two-way communication between the receiver detector and the barrier operator may be active after the receiver stops monitoring the IR beam. The communication module of the transmitter detector and the communication module of the receiver detector may be configured to send a pairing status and a battery status to the barrier operator via the wireless two-way communication.

In some examples, the transmitter and the communication module of the transmitter detector may be configured to draw power only from the battery of the transmitter detector, and where the receiver and the communication module of the receiver detector may be configured to draw power only from the battery of the receiver detector. The receiver detector may be configured to send a signal to the barrier operator to reverse movement of the movable barrier when a partial IR beam is detected. The receiver detector may be configured to compare the partial IR beam to an expected threshold to determine an intensity of the IR beam is lower or higher than the expected threshold.

In some examples, the barrier operating system may further comprise a remote device configured to receive a user input, the remote device having an energy harvester configured to receive a charging signal from the barrier operator to power the remote device. The wireless two-way communication between the transmitter detector and the barrier operator may be asynchronous such that the transmitter detector need not be prompted by the barrier operator before sending information to the barrier operator, and the wireless two-way communication between the receiver detector and the barrier operator may be asynchronous such that the receiver detector need not be prompted by the barrier operator before sending information to the barrier operator.

Consistent with some examples, a method for operating a movable barrier may comprise pairing a barrier operator with a transmitter detector and a receiver detector to establish a wireless two-way communication channel between the barrier operator and each of the transmitter detector and the receiver detector, receiving, at the barrier operator, a movable barrier close command from a remote device, sending, with the barrier operator, a command to the transmitter detector to turn on an IR beam, receiving, at the barrier operator, a communication from the transmitter detector indicating the IR beam is turned on, sending, with the barrier operator, a command to the receiver detector to monitor the IR beam, receiving, at the barrier operator, a communication from the receiver detector indicating an obstruction or an interference of the IR beam, and pausing or reversing a movement of the movable barrier based on the communication.

In some examples, the method may further comprise emitting a charging signal using an energy transmitter, receiving the charging signal with an energy harvester of the receiver detector to charge a battery of the receiver detector, and receiving the charging signal with an energy harvester of the transmitter detector to charge a battery of the transmitter detector. The method may further comprise receiving the charging signal with an energy harvester of the remote device to charge a battery of the remote device.

In some examples, the wireless two-way communication channel between the transmitter detector and the barrier operator may be active when the IR beam is turned off. The wireless two-way communication channel between the receiver detector and the barrier operator may be active after the receiver detector stops monitoring the IR beam.

In some examples, the method may further comprise reversing movement of the movable barrier when a partial IR beam is detected. Comparing the partial IR beam to an expected threshold to determine an intensity of the IR beam may be lower or higher than the expected threshold.

In some examples, the method may further comprise receiving a battery status signal at the barrier operator from both the transmitter detector and the receiver detector. The method may further comprise powering the transmitter and the IR beam only from the battery of the transmitter detector.

Consistent with some examples, a method for operating a movable barrier may comprise pairing a wireless receiver detector with a barrier operator to establish an active wireless two-way communication channel therebetween, receiving a first command to close the movable barrier, monitoring an IR beam with the wireless receiver detector, the IR beam transmitted by a wireless transmitter detector, detecting, based on the monitoring, an obstruction or an interference of the IR beam, communicating the obstruction or the interference to the barrier operator via the active wireless two-way communication channel, stopping the monitoring the IR beam, and then, maintaining the active wireless two-way communication channel between the wireless receiver detector and the barrier operator.

In some examples, the active wireless two-way communication channel between the wireless receiver detector and the barrier operator may be asynchronous such that the receiver detector need not be prompted by the barrier operator before sending information to the barrier operator.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate examples of the systems, devices, and methods disclosed herein and together with the description, serve to explain the principles of the present disclosure.

Figure 1:
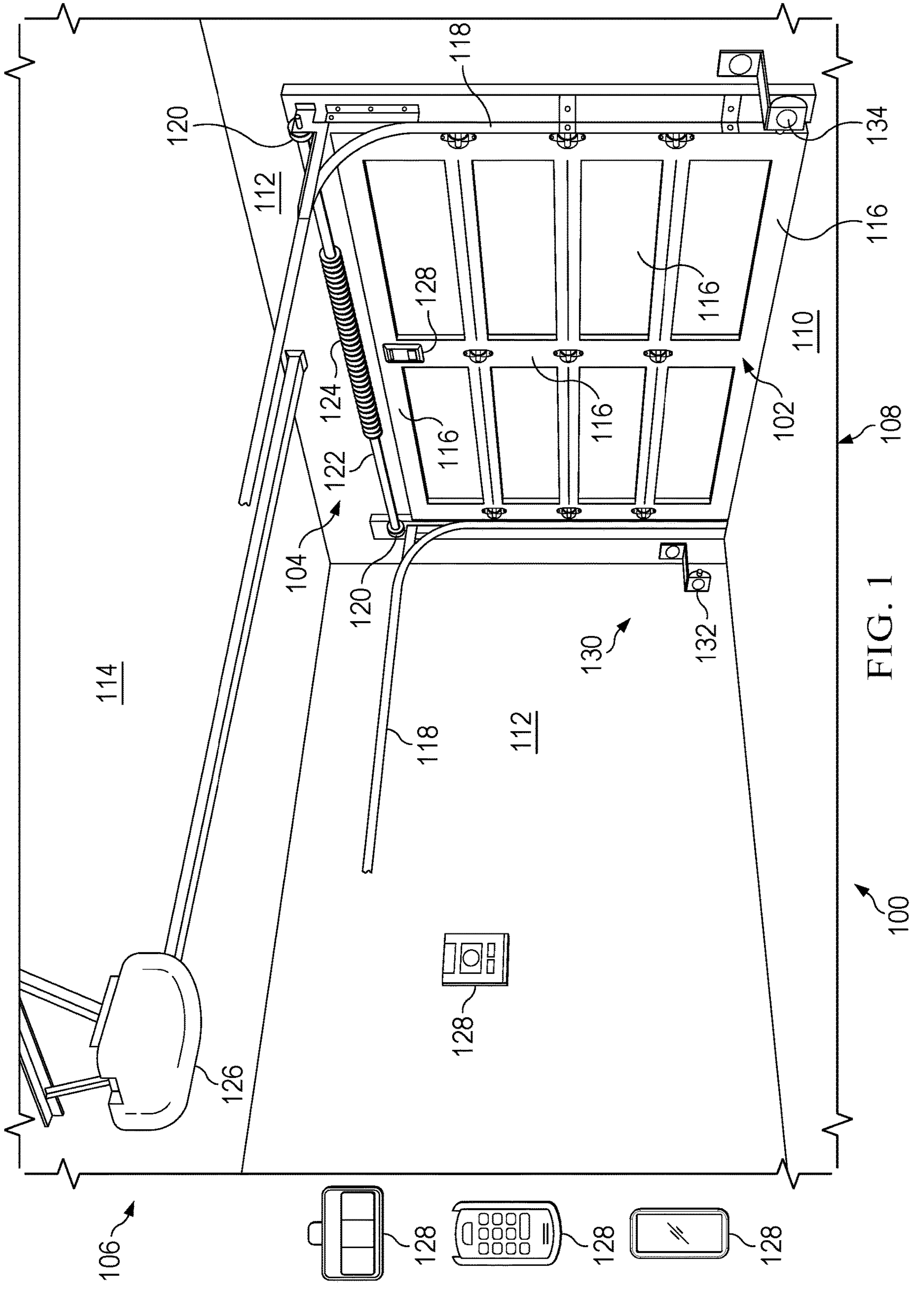
FIG. 1 is a perspective view of an installed wireless barrier operating system, according to examples of the present disclosure.

These Figures will be better understood by reference to the following Detailed Description.

DETAILED DESCRIPTION

For the purpose of promoting an understanding of the principles of the present disclosure, reference will now be made to the examples illustrated in the drawings and specific language will be used to describe them. It will nevertheless be understood that no limitation of the scope of the disclosure is intended. Any alterations and further modifications to the described systems, devices, methods, and any further application of the principles of the present disclosure are fully contemplated as would normally occur to one skilled in the art to which the disclosure relates. In addition, this disclosure describes some elements or features in detail with respect to one or more examples or Figures, when those same elements or features appear in subsequent Figures, without such a high level of detail. It is fully contemplated that the features, components, and/or steps described with respect to one or more examples or Figures may be combined with the features, components, and/or steps described with respect to other examples or Figures of the present disclosure. For simplicity, in some instances the same or similar reference numbers are used throughout the drawings to refer to the same or like parts.

FIG. 1 shows an example movable barrier system 100. The movable barrier system 100 described herein may be referred to as a barrier system, a door system, a garage door system, a gate system, or any other similar term. The movable barrier system 100 includes a movable barrier 102, a torsion system 104, and a barrier operating system 106, among other systems.

The movable barrier 102 provides access to a space 108 having a floor 110, walls 112, and a ceiling 114. In some examples, the movable barrier 102 includes a plurality of horizontally-extending sections 116 that are vertically stacked. The sections 116 may include various panels including opaque, transparent, or semi-transparent panels. The movable barrier 102 provides selective access to the space 108. In this example, the movable barrier 102 is an upward acting garage door. In some examples, the movable barrier 102 maybe a sectional-type garage door or any other suitable type of movable barrier. The movable barrier 102 is movable between open and closed positions along barrier tracks 118. The barrier tracks 118 are fixed to one of the walls 112 and the ceiling 114. In some examples, the movable barrier 102 may include one or more rolling or sliding components sized and shaped to fit within and move in a longitudinal direction along the barrier tracks 118. The rolling or sliding components may be affixed on either side of the movable barrier 102. The movable barrier 102 may be referred to as a barrier, a door, a garage door, a sectional garage door, an upward acting garage door, a gate, a movable gate, a sliding gate, or any other similar term.

The torsion system 104 counterbalances the weight of the movable barrier 102 as the movable barrier 102 is raised and lowered either manually or using the barrier operating system 106. The torsion system 104 may be part of the movable barrier 102, part of the barrier operating system 106, part of both, or separate from both. The torsion system 104 includes cable drums 120, a shaft or bar 122, one or more torsion springs 124, and safety cables, among other components. As the movable barrier 102 is opened, the torsion spring 124 unwinds, releasing stored energy to help lift the movable barrier 102. Conversely, as the movable barrier 102 closes, the torsion spring 124 rewinds, acting against the weight of the movable barrier 102.

The barrier operating system 106 facilitates the automatic opening and closing of the movable barrier 102. The barrier operating system 106 includes a barrier operator 126, one or more remote devices 128, and an obstruction detection system 130, among other things. In some examples, the barrier operating system 106 may include a jackshaft operator, a direct drive wall operator, a belt driven operator, a chain driven operator, a screw drive operator, a trolley operator, a carriage operator, or any other suitable type of operating device. For sake of brevity, some components of the barrier operating system 106 are not shown, for example, a trolley and a door arm to facilitate opening and closing of the movable barrier 102.

The barrier operator 126 is shown mounted to the ceiling 109. In some examples, the barrier operator 126 may be positioned at any other location besides the ceiling 109 within the space 108 shown in FIG. 1. The barrier operator 126 serves many purposes. The barrier operator 126 communicates with the remote devices 128 and causes movement of the movable barrier 102. Further, the barrier operator 126 transmits power to one or more of the remote devices 128. The barrier operator 126 may be referred to as an operator, a door operator, a garage door operator, a gate operator, an opener, a door opener, a garage door opener, a gate opener, a control system, or any other similar term. Further details about the barrier operator 126 will be discussed below with respect to FIG. 2.

The one or more remote devices 128 can be used to control and command the barrier operator 126 to open or close the movable barrier 102. In some examples, the one or more remote devices 128 include a wall-mounted console, a door positioning system ("DPS") mounted on the movable barrier 102, a wall-mounted keypad, a movable remote button, a mobile device, or a computer, among other things. The remote devices 128 have a user interface, such as an input button or command button to initiate a command to activate the barrier operator 126. Although the remote devices 128 typically command the barrier operator 126 to open or close, the remote devices 128 can be configured to control the barrier operator 126 in other ways. For example, the remote devices 128 can prompt the barrier operator 126 to maintain the movable barrier 102 in a certain position between an opened and closed state. Further details about the one or more remote devices 128 will be discussed below with respect to FIG. 2.

Figure 2:
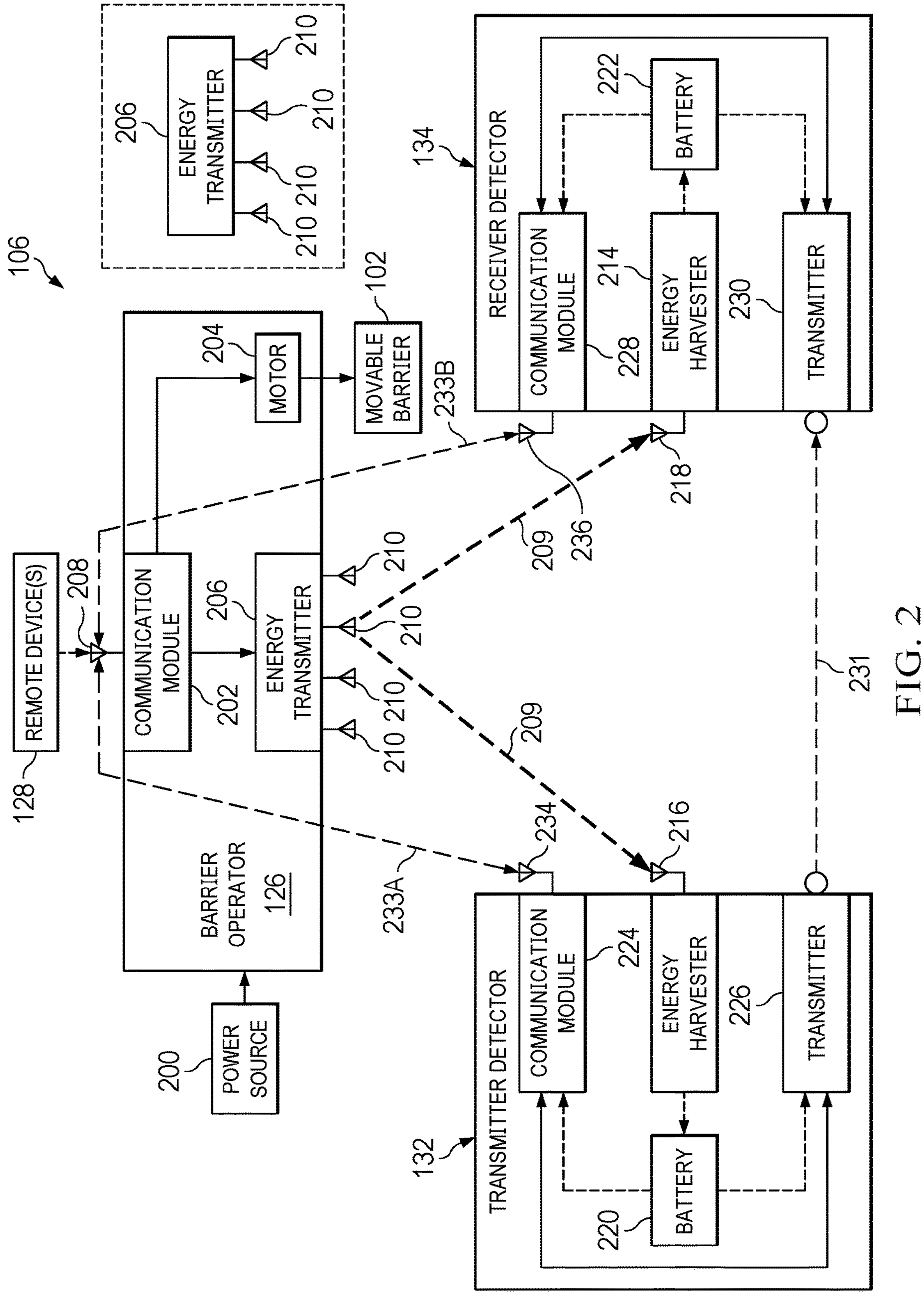
FIG. 2 is a block diagram of a wireless barrier operating system, according to examples of the present disclosure.

The obstruction detection system 130 may ensure that the movable barrier 102 does not close when an obstruction is located in the path of the movable barrier 102 or an interference is preventing accurate detection of an obstruction. If an obstruction is detected along the path of the movable barrier 102, the obstruction detection system 130 may pause movement of the movable barrier 102 or may reverse a direction of movement of the movable barrier 102. The obstruction detection system 130 includes a transmitter detector 132 and a receiver detector 134. The transmitter detector 132 is configured to transmit an infrared ("IR") beam 231 (FIG. 2). The receiver detector 134 is configured to receive the IR beam 231. The obstruction detection system 130 may be referred to as photo eyes or as safety beam sensors. In some examples, the obstruction detection system 130 is fully wireless. Further details of the obstruction detection system 130 will be discussed below with respect to FIG. 2.

Traditionally, the components of movable barrier operating systems communicate with one another via direct connections using physical wires or cables. Certain issues occur when physical wires and cables are used as the medium of communication and for connection. For example, physical wires are prone to deterioration, are physically unappealing, and can be damaged by outside forces such as animals or objects, among other issues. This disclosure provides for wireless movable barrier operating systems and methods, among other things. For example, the disclosure provides for energy harvesting by the obstruction detection system and always-active asynchronous wireless two-way communication channels for passing along commands and information.

FIG. 2 shows the barrier operating system 106 in block diagram form. Particularly, the block diagram illustrates the relationships between the barrier operator 126, the remote device(s) 128, the transmitter detector 132, and the receiver detector 134.

The barrier operator 126 is powered by a power source 200. The power source 200 is shown as an external power source, but in some cases, the power source 200 may be a battery housed within the barrier operator 126. The barrier operator 126 includes, among other things, a communication module 202, and a motor 204. The barrier operating system 106 also includes an energy transmitter 206. The energy transmitter may be mounted anywhere in the space 108 to best facilitate line-of-sight power transfer. In some examples the energy transmitter 206 is independent from the barrier operator 126. In other examples, the energy transmitter 206 is part of the barrier operator. In yet other examples, multiple energy transmitters 206 are used. When the energy transmitter 206 is not part of the barrier operator 126, the energy transmitter 206 may include a communication module and may communicate with the barrier operator 126, the transmitter detector 132, and the receiver detector 134. The one or more remote devices 128 may be in wireless two-way communication with the communication module 202 via an antenna 208. It is understood that anytime an antenna is described in this disclosure, multiple antennas can be used to perform the task. Similarly, whenever multiple antennas are described, some examples include only a single antenna. The remote devices 128 may be powered using a portable power source such as a battery or an external power source. The remote devices 128 may include a user interface configured to receive a user input. Upon receipt of an input by a user at the user interface, the remote device can command the barrier operator 126 to open or close the movable barrier 102. The opening and closing of the movable barrier 102 is actuated by a motor 204. The communication module 202 instructs the motor 204 to lift or lower the movable barrier 102.

The energy transmitter 206 may be configured to emit a charging signal 209 using one or more antennas 210. In some examples, the charging signal 209 is radio frequency ("RF") power in the Industrial, Scientific, and Medical ("ISM") band. The transmitter detector 132 and the receiver detector 134 may include energy harvesters 212 and 214, respectively. The energy harvesters 212, 214 may include antennas 216 and 218. In this way, the energy harvester 212 is configured to receive the charging signal 209 and recharge a battery 220 of the transmitter detector 132. Similarly, the energy harvester 214 is configured to receive the charging signal 209 and recharge the battery 222 of the receiver detector 134. The ability of the transmitter detector 132 and the receiver detector 134 to harvest energy allows the obstruction detection system 130 to sustain itself without wired connections. In some examples, the battery is disposed between the energy harvester and all other energy consuming components of the transmitter detector or the receiver detector. In this way, the battery provides power to the non-energy harvesting components of the transmitter detector or the receiver detector. Thus, in some examples, the charging signal 209 supplies power to the batteries 220 and 222 only and does not supply instantaneous power for the transmitter detector 132 and the receiver detector 134.

In some examples, the battery 220 of the transmitter detector 132 supplies power to a communication module 224 and a transmitter 226 of the transmitter detector 132. Similarly, the battery 222 of the receiver detector 134 may supply power to a communication module 228 and a receiver 230 of the receiver detector 134. In this way, the transmitter detector 132 and the receiver detector 134 may be sustained by battery power alone, eliminating the need for any physical wires or cables.

The communication module 224 and the transmitter 226 of the transmitter detector 132 may be in direct communication. In some examples, the transmitter 226 is slave to the communication module 224. Similarly, the communication module 228 and the receiver 230 of the receiver detector 134 may be in direct communication. In some examples, the receiver 230 is slave to the communication module 228. In this way, the communication modules 224, 228, after receiving or sending information to the barrier operator 126, can turn the dedicated transmitter 226 and the dedicated receiver 230 on and off. When turned on, the transmitter 226 is configured to transmit the infrared ("IR") beam 231 in the direction of the receiver 230. When instructed to monitor, the receiver 230 is configured to receive the transmitted IR beam 231. The receiver 230 may be programmed with an expected energy or intensity threshold indicative of a clear path between the transmitter 226 and the receiver 230, and therefore an obstruction-clear pathway. The expected energy or threshold may be based the receiver detecting a certain amount of intensity of the IR beam over a given amount of time. This expected threshold may include both an upper threshold limit and a lower threshold limit. A deviation in amount or intensity of the IR beam higher or lower than the expected threshold limits will cause the receiver 230 to sense an obstruction or an interference. Upon sensing an obstruction or an interference, the communication module 228 communicates this occurrence to the barrier operator 126. A communication of an obstruction or an interference to the barrier operator 126 causes the barrier operator 126 to pause or reverse the direction of movement of the movable barrier 102, to minimize or avoid contact between the movable barrier 102 and the obstruction.

In some examples, an obstruction detected by the receiver detector 134 may be a physical object in the line of sight of the IR beam 231 (path of a closing movable barrier 102). This results in a blocked IR beam. In some examples, an interference may be any corruption of the IR beam 231 other than a physical object in the line of sight of the IR beam 231. For example, the interference may occur when sunlight shines into and conflicts with the IR beam 231. This results in a partial IR beam. In such an example, the receiver 230 may detect the partial IR beam. In other examples, the interference occurs when a signal or communication from another sensor of the movable barrier system conflicts with the IR beam 231.

As shown, the barrier operator 126 may remain in active wireless two-way communication with the transmitter detector 132 and the receiver detector 134, via communication channels 233A and 233B, respectively. The transmitter detector 132 and the receiver detector 134 may include antennas 234, 236 for facilitating the transfer of information. The communication channels 233A, 233B may be wireless Bluetooth communication channels, and the communication channels 233A, 233B may remain active at all times. Although Bluetooth is mentioned here, the communication could be over other local networked devices, such as Wi-Fi or near field communication ("NFC"), among other examples. It is advantageous that the communication channels remain active so that there is no delay in the transfer of information between the obstruction detection system 130 and the barrier operator 126. It is possible that the communication channels 233A and 233B remain active at all times because the energy harvesters 212, 214 can keep the batteries charged. Additionally, the communication channels 233A, 233B provide for two-way asynchronous communication. In this way, any component of the movable barrier system 100 may send information to the barrier operator 126 without needing to be prompted by the barrier operator 126 first, and vice versa. Further, the transmitter detector 132 and the receiver detector 134 may interrupt any ongoing process to relay information to the barrier operator 126, or vice versa.

Many types of information can be sent via the communication channels 233A, 233B. For example, information relating to connection/linking status, battery status, and operating commands (e.g., on/off and monitoring/not monitoring) can be shared, among other things. As one example, the communication modules 224 and 228 determine a battery status of their respective batteries. The battery status is wirelessly communicated back to the barrier operator 126 via communication channels 233A and 233B. Upon receipt of the battery status by the barrier operator 126, the communication module 202 determines whether or not power should be emitted by the energy transmitter 206 for harvesting by the energy harvesters 212, 214. As another example, the barrier operator 126 determines whether the barrier operator 126 is paired with the transmitter detector 132 and the receiver detector 134. If so, a confirmation is sent to the transmitter detector 132 and the receiver detector 134. In other examples, the transmitter detector 132 and the receiver detector 134 send a confirmation to the barrier operator 126 once they have connected/paired to the barrier operator 126. Although it is not illustrated in FIG. 2, in some examples, the transmitter detector 132 and the receiver detector 134 communicate wirelessly with each other, rather than wirelessly through the barrier operator 126. For example, the transmitter detector 132 may provide information to the receiver detector 134 about the IR beam it is transmitting. Conversely, the receiver detector 134 can provide information directly to the transmitter detector 132.

The technologies and advancements described above allow the methods shown in FIGS. 3-5 to be performed. For example, the energy-harvesting capabilities and the always-active asynchronous two-way communication capabilities can be used to carry out the methods. For example, before or during the method 300, the remote devices 128, the transmitter detector 132, and the receiver detector 134 can harvest energy emitted from the energy transmitter 206 to supply and recharge their respective batteries. Because the communication channels 233A and 233B allow for asynchronous two-way wireless communication, the components of the movable system can supply each other with data and commands to ensure that the movable barrier system operates efficiently and accurately, preventing closure of the movable barrier 102 onto obstructions.

Figure 3A:
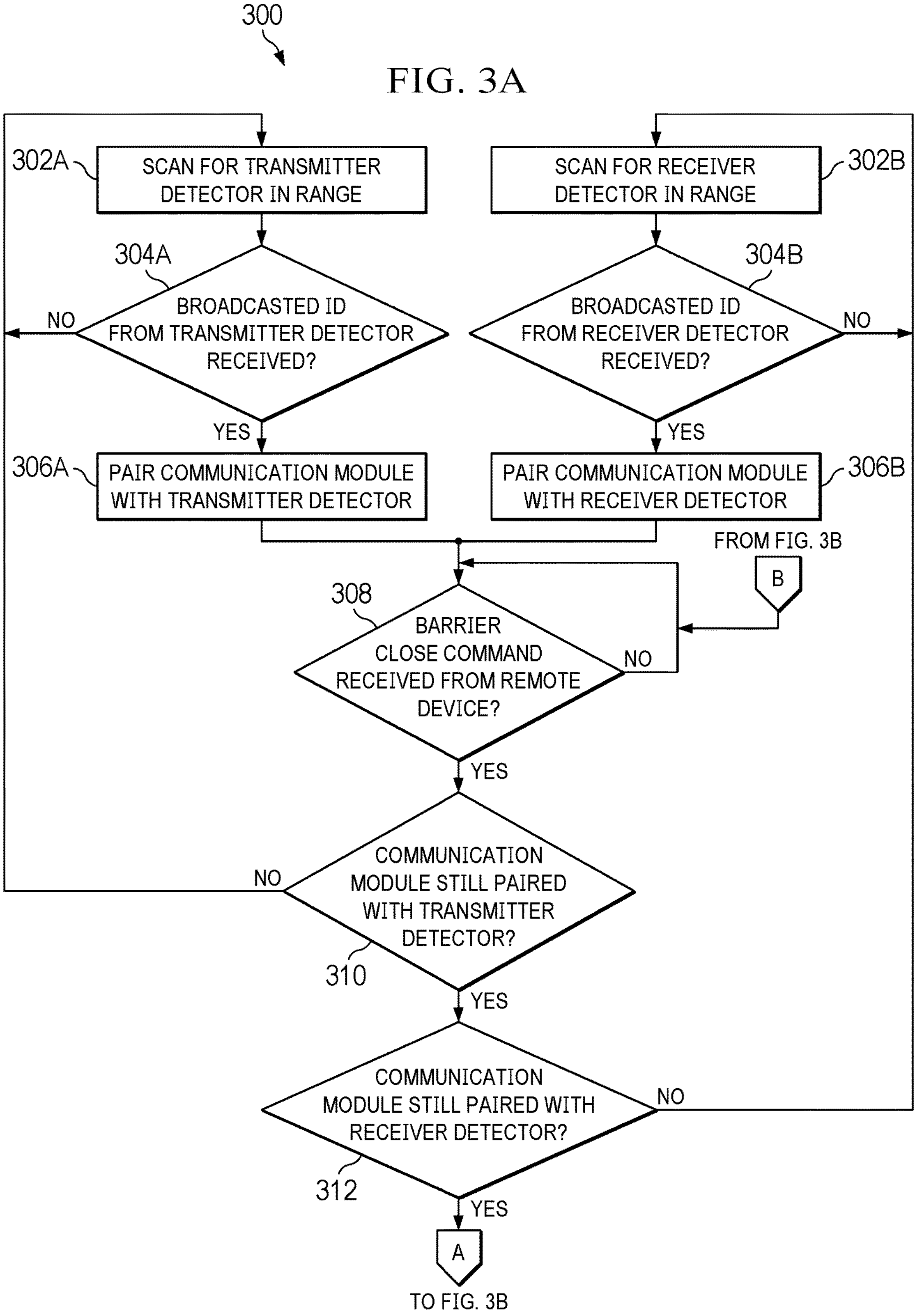
FIGS. 3A and 3B are flow charts illustrating a method for operating a movable barrier using a barrier operator, according to examples of the present disclosure.
Figure 3B:
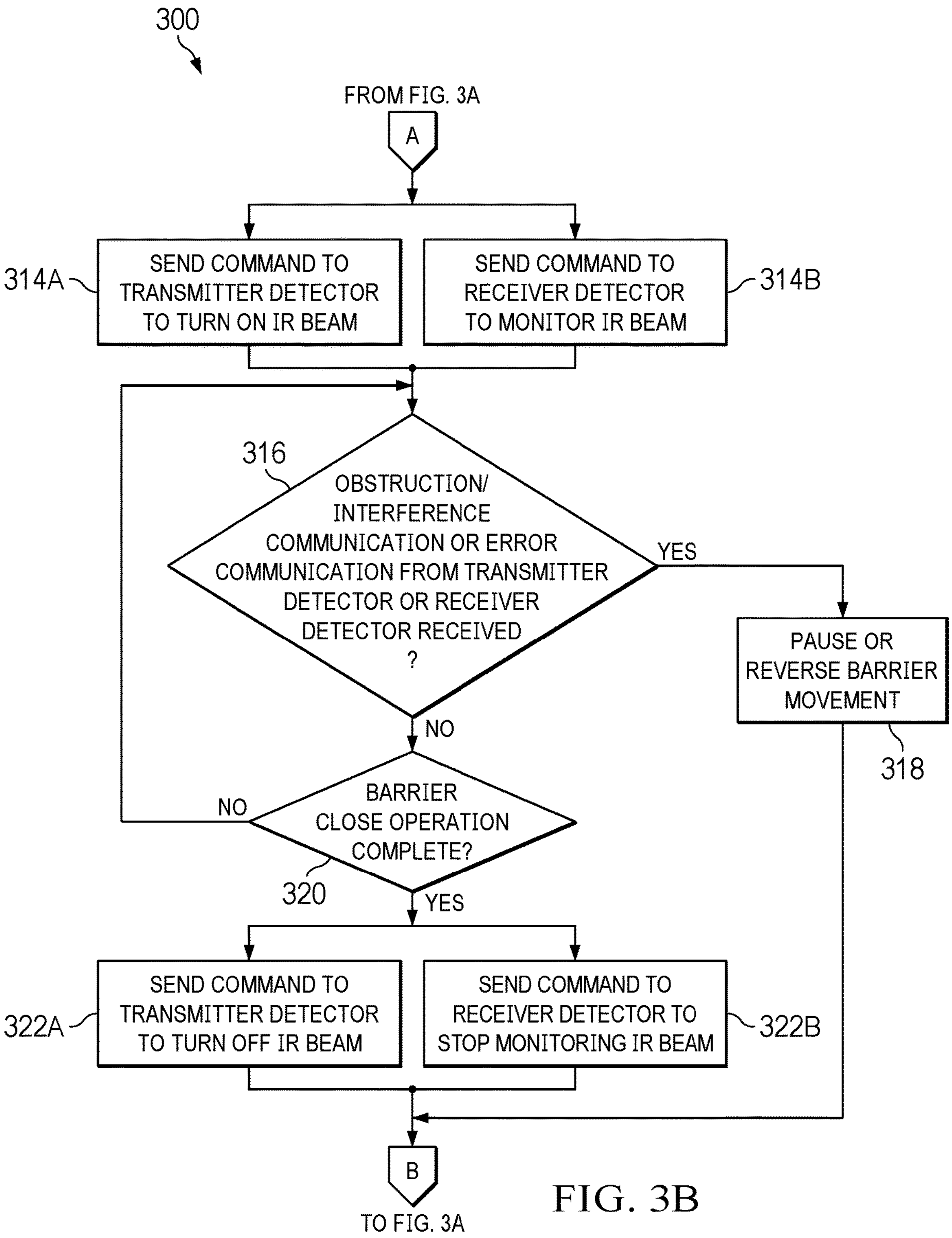

FIG. 3, made up of both FIGS. 3A and 3B, shows an example method 300 for operating a movable barrier (e.g., the movable barrier 102) using a barrier operator (e.g., the barrier operator 126). While FIG. 3 illustrates operations according to one example, other examples may omit, add to, reorder and/or modify any of the operations shown in FIG. 3.

At operations 302A and 302B, in some examples, the barrier operator 126 scans to determine if the transmitter detector 132 and the receiver detector 134 are in range. Scanning for the obstruction detection system 130 may include sensing, using the antenna 208 of the communication module 202, for signals emitted by the communication modules 224, 228 of the obstruction detection system 130. Scanning for the transmitter detector 132 and scanning for the receiver detector 134 may occur at the same or different times.

Operations 304A and 304B, in some examples, includes determining whether a broadcasted identification ("ID") emitted from each of the transmitter detector 132 and the receiver detector 134 have been received at the barrier operator 126. In some examples, the communication module 202 may be programed to expect an ID from each of the transmitter detector 132 and the receiver detector 134. If broadcasted IDs sent by the obstruction detection system 130 have not been received at the barrier operator 126, the barrier operator 126 may revert back to operations 302A and 302B to continue scanning for a transmitter detector and a receiver detector in range. If broadcasted IDs sent by the obstruction detection system 130 have been received at the barrier operator 126, then the method continues on to operation 306. Determining whether a broadcasted identification ("ID") emitted from the transmitter detector 132 has been received and determining whether a broadcasted ID emitted from receiver detector 134 has been received may occur at the same or different times.

At operations 306A and 306B, the barrier operator 126 pairs the communication module 202 of the barrier operator with the transmitter detector 132 and the receiver detector 134. In some examples, this includes pairing via Bluetooth. The Bluetooth technology may include Bluetooth low energy ("BLE"). The pairing process may include sharing of addresses, names, and profiles of the paired components, and storing the data on local memory. Once paired, the method proceeds to operation 308. Pairing the communication module 202 of the barrier operator 126 with the transmitter detector 132 and pairing the communication module 202 with the receiver detector 134 may occur at the same or different times.

At operation 308, in some examples, the barrier operator 126 determines whether a movable barrier close or other (e.g., open) command is received from any of the remote devices 128. If the barrier operator 126 makes a determination that no such command has been received, it continues listening. In some examples, the barrier operator 126 listens for a command indefinitely until a command is received. Once the command is received, the method proceeds to operation 310.

At operation 310, in some examples, the communication module 202 determines whether it is still paired with the transmitter detector 132. If the pairing has lapsed or the connection has been interrupted, the method reverts back to operations 302A and 302B and begins scanning again. If the pairing between the communication module 202 and the communication module 224 of the transmitter detector 132 is still valid, the method proceeds to operation 312. Sometimes, operation 310 and 312 are performed simultaneously. Or operation 312 is performed before operation 310.

At operation 312, in some examples, the communication module 202 determines whether it is still paired with the receiver detector 134. If the pairing has lapsed or the connection has been interrupted, the method reverts back to operations 302A and 302B and begins scanning again. If the pairing between the communication module 202 and the communication module 228 of the receiver detector 134 is still valid, the method proceeds to operations 314A and 314B.

At operations 314A and 314B, in some examples, the barrier operator 126 sends commands to both the transmitter detector 132 and the receiver detector 134. The transmitter detector 132 is commanded to turn on the IR beam 231 and being transmitting the IR beam 231 towards the receiver detector 134. The receiver detector 134 is commanded to monitor the IR beam 231. By using the IR beam only in anticipation of door movement, the power consumption may be minimized, preserving battery life. Sending commands to the transmitter detector 132 and sending commands to the receiver detector 134 may occur at the same or different times.

At operation 316, in some examples, the barrier operator 126 waits for and determines whether an obstruction communication, an interference communication, or an error has been received from either the transmitter detector 132 or the receiver detector 134. In some examples, the barrier operator 126 also determines whether an error message is received from any of the remote devices 128. As explained more fully below with respect to FIG. 5, the receiver detector 134 may communicate an obstruction or interference based on its monitoring of the IR beam and an amount or intensity of the IR beam, relative to a threshold, that it expects to receive. Any of the transmitter detector 132, the receiver detector 134, the remote devices 128, and the barrier operator 126 can supply the barrier operator 126 with an error message. Errors can occur for a variety of reasons. For example, if one of the batteries is low on power the error may alert the barrier operator 126 or the energy transmitter 206 itself to emit more charging signals from the energy transmitter 206 for harvesting by the energy harvesters 212, 214. It may emit the charging signals with higher intensity or for an extended period of time. In other examples, the error alerts the barrier operator 126 that pairing between the devices has been disconnected. In some examples, the error may warn the barrier operator 126 that an event has occurred that prevents the transmitter detector 132 or the receiver detector 134 from performing their intended duty. For example, if the transmitter detector 132 or the receiver detector 134 are kicked or knocked off alignment, the obstruction detection system 130 can understand that the IR beam 231 will no longer be successfully sent and received. In yet other examples, the barrier operator 126 supplies itself with an error message. For example, when the motor 204 is malfunctioning, or pairing with the obstruction detection system 130 has been lost.

If an obstruction/interference communication or an error communication is received, then the method proceeds to operation 318. At operation 318, in some examples, the barrier operator 126 pauses or reverses the movement of the movable barrier 102. If the movable barrier 102 is being closed, the barrier operator 126 may cause the movable barrier 102 to pause or to reverse course, preventing the movable barrier 102 from contacting the obstruction.

If an obstruction/interference communication or an error communication is not received, then the method proceeds to operation 320. At operation 320, in some examples, the barrier operator 126 determines whether the barrier operation is complete. If the movable barrier operation is not complete (e.g., the movable barrier 102 has not fully enclosed the space 108), the method circles back to operation 316, and the barrier operator 126 continues listening for an obstruction/interference or an error message. This process repeats itself until either the movement of the barrier is paused or reversed, or the movable barrier close operation is completed.

At operations 322A and 322B, in some examples, after a successful movable barrier close operation, the barrier operator 126 sends a command to the transmitter detector 132 to turn off the IR beam 231 and sends a command to the receiver detector 134 to stop monitoring the IR beam 231. Thereafter, the method may revert back to operation 308 where the barrier operator 126 listens for the next movable barrier close command, and the method can be used again in a second iteration. Sending the command to the transmitter detector 132 to turn off the IR beam 231 and sending the command to the receiver detector 134 to stop monitoring the IR beam 231 may occur at the same or different times.

Figure 4:
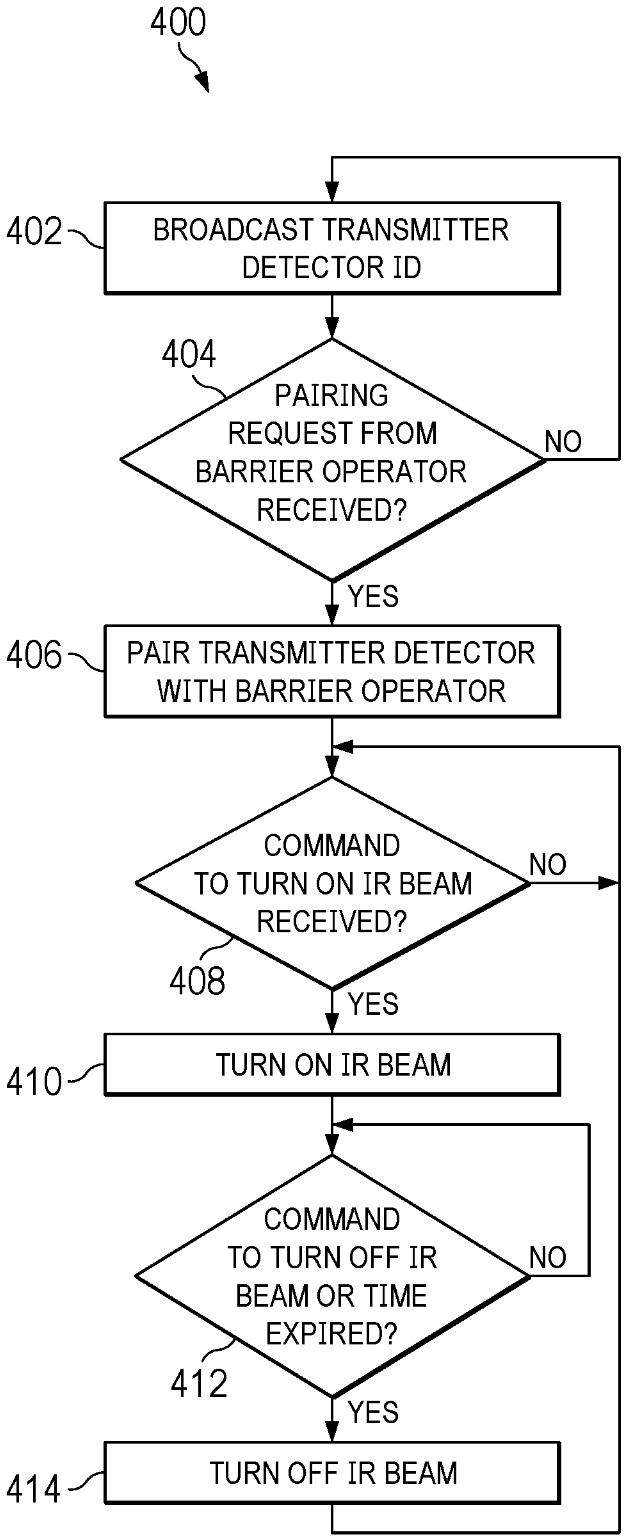
FIG. 4 is a flow chart illustrating a method for operating a movable barrier using a transmitter detector, according to examples of the present disclosure.

FIG. 4 shows an example method 400 for operating a movable barrier using a transmitter detector (e.g., the transmitter detector 132). While FIG. 4 illustrates operations according to one example, other examples may omit, add to, reorder and/or modify any of the operations shown in FIG. 4.

At operation 402, in some examples, the transmitter detector 132 broadcasts an identification ("ID"). The ID is available and can be received by the barrier operator 126 so that the barrier operator 126 knows which type, style, generation, and/or model with which it is pairing. The broadcasted ID may help the barrier operator 126 to verify that it is compatible with the particular transmitter detector 132. The data contained in and associated with the broadcasted ID can be stored in memory of the barrier operator 126.

At operation 404, in some examples, the transmitter detector 132 determines whether a pairing request from the barrier operator 126 has been received. The transmitter detector 132 may use the antenna 234 to search and listen for the pairing request.

If no pairing request is received, the method 400 reverts back to operation 402 and the transmitter detector 132 continues broadcasting the transmitter detector ID. If a pairing request has been received, then, at operation 406, the transmitter detector 132 is paired with the barrier operator 126. Example pairing technologies and processes are described above with respect to operations 306A and 306B.

At operation 408, the communication module 224 of the transmitter detector 132 waits for a command from the barrier operator 126 to turn on the IR beam 231. This operation repeats itself until a turn on command is received. In some examples, the remote device 128 or the receiver detector 134 are able to command the transmitter detector 132 to turn the IR beam 231 on, via two-way communication channels.

At operation 410, the IR beam 231 is turned on. The dedicated transmitter 226 emits the IR beam. IR beam 231 is directed at the receiver 230 of the receiver detector 134. The IR beam 231 is emitted continuously to ensure that no obstructions are present in the movable barrier 102 path.

At operation 412, the communication module 224 of the transmitter detector 132 waits for the barrier operator 126 to command the transmitter detector 132 to turn off the IR beam 231 or until a pre-determined amount of time expires. The command to turn off the IR beam 231 typically arises once a movable barrier close operation has completed. Until the movable barrier close operation finishes, it is important for the IR beam 231 to stay on.

At operation 414, the transmitter detector turns off the IR beam once a command to do so has been received or once a pre-determined amount of time has expired. Turning the IR beam off may protect battery life of the transmitter detector 132. As shown in the method 400, although the IR beam 231 is no longer on, the transmitter detector 132 may stay paired with the barrier operator 126 and remain alert and active using the two-way communication channel 233A. This helps avoid delay that can occur between the time that a command to turn on the IR beam 231 is given and when the transmitter detector 132 turns on the IR beam 231.

Figure 5:
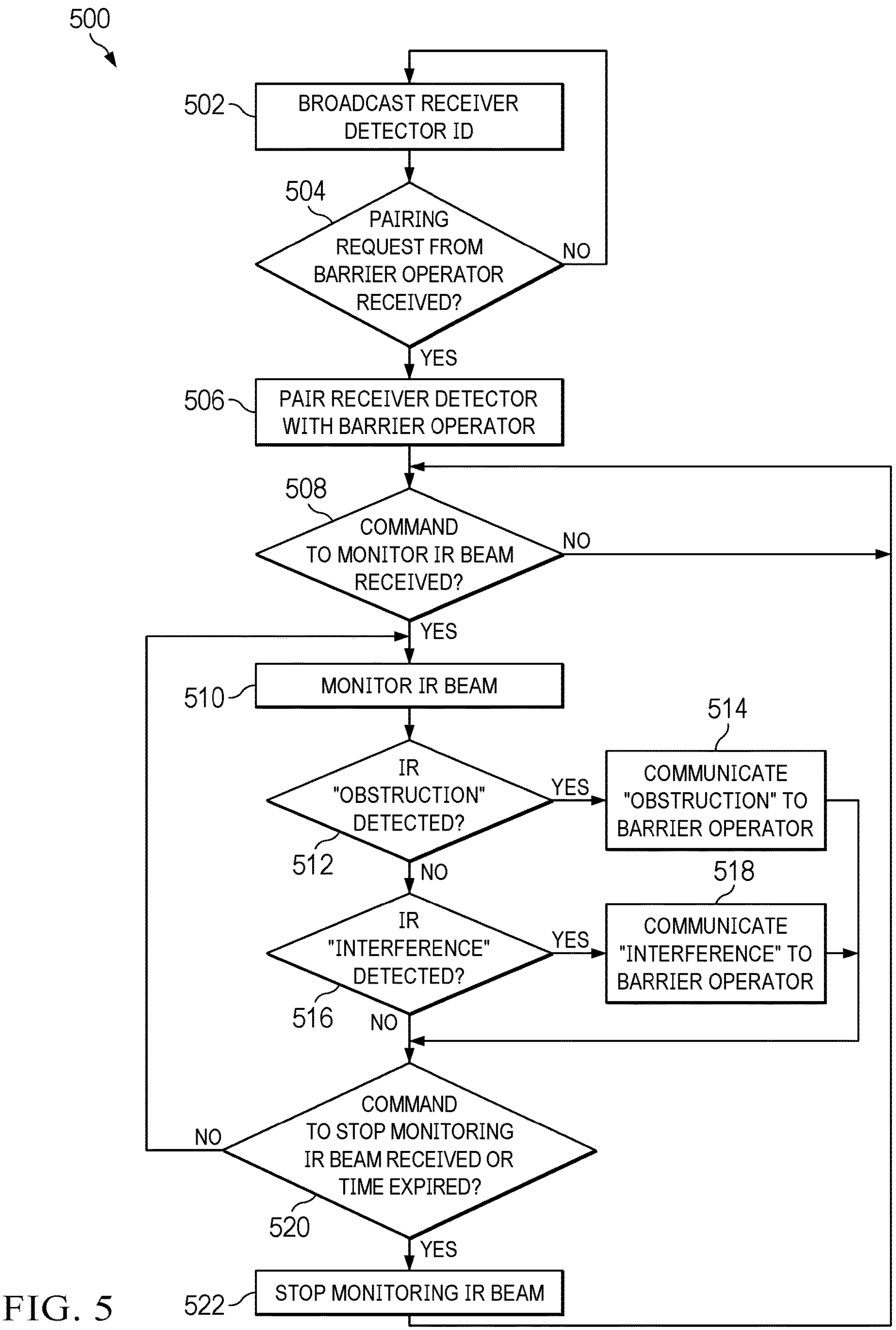
FIG. 5 is a flow chart illustrating a method for operating a movable barrier using a receiver detector, according to examples of the present disclosure.

FIG. 5 shows an example method 500 for operating a movable barrier using a receiver detector (e.g., the receiver detector 134). While FIG. 5 illustrates operations according to one example, other examples may omit, add to, reorder and/or modify any of the operations shown in FIG. 5.

At operation 502, the receiver detector 134 broadcasts an identification ("ID"). The ID is available and can be received by the barrier operator 126 so that the barrier operator 126 knows which type, style, generation, and/or model with which it is pairing. The broadcasted ID may help the barrier operator 126 to verify that it is compatible with the particular receiver detector 134. The data contained in and associated with the broadcasted ID can be stored in memory of the barrier operator 126.

At operation 504, in some examples, the receiver detector 134 determines whether a pairing request from the barrier operator 126 has been received. The receiver detector 134 may use the antenna 236 to search and listen for the pairing request.

If no pairing request is received, the method 500 reverts back to operation 502 and the receiver detector 134 continues broadcasting the receiver detector ID. If a pairing request has been received, then, at operation 506, the receiver detector 134 is paired with the barrier operator 126. Example pairing technologies and processes are described above with respect to operation 306.

At operation 508, in some examples, the communication module 228 of the receiver detector 134 waits for a command from the barrier operator 126 to monitor the IR beam 231. This operation repeats itself until a monitor command is received. In some examples, the remote device 128 or the transmitter detector 132 are able to command, via wireless two-way communication channels, the receiver detector 134 to monitor the IR beam 231.

At operation 510, in some examples, the IR beam 231 is monitored. The dedicated receiver 230 receives the IR beam 231.

At operation 512, in some examples, the receiver detector 134 monitors for an obstruction. In some examples, monitoring for an obstruction includes determining that no or almost no IR beam 231 is being received at the receiver 230. When no IR beam is received, it indicates that an object is in the path of the movable barrier 102. If the receiver detector 134 determines that there is an obstruction, the obstruction is communicated to the barrier operator 126 at operation 514 and the method proceeds to operation 520.

At operation 516, in some examples, the receiver detector 134 monitors for an interference. In some examples, monitoring the IR beam 231 for an interference may include determining whether an expected amount or intensity of the IR beam 231 is being received over a given amount of time. If the expected amount or intensity of the IR beam 231 is lower or higher than the expected amount or an expected threshold, then there is an interference. In some examples, an interference may be caused by sunlight or the presence of a substance in the air. In other examples, other sensors includes in the movable barrier system 100 may conflict with the IR beam 231 and cause the interference. If the receiver detector 134 determines that there is an interference, the interference is communicated to the barrier operator 126 at operation 514 and the method proceeds to operation 520. If no interference is detected, then the method also proceeds to operation 520, but no communication is given to the barrier operator 126 regarding an interference.

At operation 520, in some examples, the receiver detector 134 waits for a command from the barrier operator 126 to stop monitoring the IR beam 231 or until a pre-determined amount of time expires. If no command to stop monitoring is given and the pre-determined amount of time has not expired, then the method continues monitoring the IR beam at operation 510. A command to stop monitoring the IR beam 231 typically arises once a movable barrier close operation has completed. Until the movable barrier close operation finishes, it is important for the IR beam 231 to remain monitored.

At operation 522, the receiver detector 134 stops monitoring the IR beam 231 once a command to do so has been received or once a pre-determined amount of time has expired. Ceasing monitoring of the IR beam 231 may protect battery life of the receiver detector 134. As shown in the method 500, although the IR beam 231 is no longer monitored, the receiver detector 134 may stay paired with the barrier operator 126 and remain alert and active using the two-way communication channel 233B. This helps avoid delay that can occur between the time that a command to monitor the IR beam 231 is given and when the receiver detector 134 begins monitoring. In prior conventional systems, if the photo eyes go to sleep and do not remain in active communication with the barrier operator, a delay occurs upon reactivation of the photo eyes, thereby causing a delay in movement of the garage door. Even if the delay is short, the delay may be frustrating to a user operating the system and may cause the user to believe the system is non-responsive to inputs at a user device. These and other issues are solved using the systems and methods described herein.

The methods described herein are illustrated as a set of operations or processes. Not all the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, systems herein support wireless communication protocols such as RF, Bluetooth, IrDA, HomeRF, IEEE 802.11, DECT, and Wireless Telemetry.

In some instances, well-known methods, procedures, components, and circuits have not been described in detail so as not to unnecessarily obscure aspects of the examples. While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

What is claimed is:

1. A barrier operating system comprising:
- a barrier operator configured to emit a charging signal and configured to open and close a movable barrier; and
- a wireless obstruction detection system comprising:
  - a transmitter detector comprising:
    - a battery;
    - a transmitter configured to transmit an IR beam;
    - a communication module in active wireless asynchronous two-way communication with the barrier operator when the IR beam is off such that the transmitter detector need not be prompted by the barrier operator before sending information to the barrier operator when the IR beam is off; and
    - an energy harvester configured to receive the charging signal and direct power to the battery of the transmitter detector; and
  - a receiver detector comprising:
    - a battery;
    - a receiver configured to receive the IR beam from the transmitter;
    - a communication module in wireless two-way communication with the barrier operator; and
    - an energy harvester configured to receive the charging signal and direct power to the battery of the receiver detector.

2. The barrier operating system of claim 1, wherein the wireless two-way communication between the receiver detector and the barrier operator is active after the receiver stops monitoring the IR beam.

3. The barrier operating system of claim 1, wherein the communication module of the transmitter detector and the communication module of the receiver detector are configured to send a pairing status and a battery status to the barrier operator via the wireless two-way communication.

4. The barrier operating system of claim 1, wherein the transmitter and the communication module of the transmitter detector are configured to draw power only from the battery of the transmitter detector, and where the receiver and the communication module of the receiver detector are configured to draw power only from the battery of the receiver detector.

5. The barrier operating system of claim 1, wherein the receiver detector is configured to send a signal to the barrier operator to reverse movement of the movable barrier when a partial IR beam is detected.

6. The barrier operating system of claim 5, wherein the receiver detector is configured to compare the partial IR beam to an expected threshold to determine an intensity of the IR beam is lower or higher than the expected threshold.

7. The barrier operating system of claim 1, further comprising a remote device configured to receive a user input, the remote device having an energy harvester configured to receive a charging signal from the barrier operator to power the remote device.

8. The barrier operating system of claim 1, wherein the wireless two-way communication between the receiver detector and the barrier operator is asynchronous such that the receiver detector need not be prompted by the barrier operator before sending information to the barrier operator.

9. A method for operating a movable barrier, the method comprising:

pairing a barrier operator with a transmitter detector and a receiver detector to establish an active wireless asynchronous two-way communication channel between the barrier operator and each of the transmitter detector and the receiver detector;

receiving, at the barrier operator, a movable barrier close command from a remote device;

sending, with the barrier operator, a command to the transmitter detector to turn on an IR beam;

receiving, at the barrier operator, a communication from the transmitter detector indicating the IR beam is turned on;

sending, with the barrier operator, a command to the receiver detector to monitor the IR beam;

receiving, at the barrier operator, a communication from the receiver detector indicating an obstruction or an interference of the IR beam;

pausing or reversing a movement of the movable barrier based on the communication; and maintaining the active wireless asynchronous two-way communication channel between the barrier operator and the transmitter detector when the IR beam is off such that the transmitter detector need not be prompted by the barrier operator before sending information to the barrier operator when the IR beam is off; or maintaining the active wireless asynchronous two-way communication channel between the barrier operator and the receiver detector when the IR beam is not being monitored such that the receiver detector need not be prompted by the barrier operator before sending information to the barrier operator when the IR beam is not being monitored.

10. The method of claim 9, further comprising:

emitting a charging signal using an energy transmitter;

receiving the charging signal with an energy harvester of the receiver detector to charge a battery of the receiver detector; and receiving the charging signal with an energy harvester of the transmitter detector to charge a battery of the transmitter detector.

11. The method of claim 10, further comprising receiving the charging signal with an energy harvester of the remote device to charge a battery of the remote device.

12. The method of claim 9, further comprising reversing movement of the movable barrier when a partial IR beam is detected.

13. The method of claim 12, comprising comparing the partial IR beam to an expected threshold to determine an intensity of the IR beam is lower or higher than the expected threshold.

14. The method of claim 9, comprising receiving a battery status signal at the barrier operator from both the transmitter detector and the receiver detector.

15. The method of claim 10, comprising powering the transmitter detector and the IR beam only from the battery of the transmitter detector.

16. A method for operating a movable barrier, the method comprising:

pairing a wireless receiver detector with a barrier operator to establish an active wireless asynchronous two-way communication channel therebetween;

receiving a first command to close the movable barrier;

monitoring an IR beam with the wireless receiver detector, the IR beam transmitted by a wireless transmitter detector;

detecting, based on the monitoring, an obstruction or an interference of the IR beam;

communicating the obstruction or the interference to the barrier operator via the active wireless asynchronous two-way communication channel;

stopping the monitoring the IR beam; and then, maintaining the active wireless asynchronous two-way communication channel between the wireless receiver detector and the barrier operator when the IR beam is not being monitored such that the receiver detector need not be prompted by the barrier operator before sending information to the barrier operator when the IR beam is not being monitored.

* * * * *